US008172527B2

(12) United States Patent
Duchatelle et al.

(10) Patent No.: US 8,172,527 B2
(45) Date of Patent: May 8, 2012

(54) INTERMEDIATE CASING EXTENSION FOR AN AIRCRAFT JET ENGINE, COMPRISING A SECTORISED ANNULAR GROOVE FOR RECEIVING THE NACELLE COVERS

(75) Inventors: Thierry Francois Maurice Duchatelle, Creteil (FR); Arnaud Sanchez, Brunoy (FR)

(73) Assignee: SNECMA, Paris (FR)

( * ) Notice: Subject to any disclaimer, the term of this patent is extended or adjusted under 35 U.S.C. 154(b) by 680 days.

(21) Appl. No.: 12/334,949

(22) Filed: Dec. 15, 2008

(65) Prior Publication Data

US 2009/0155070 A1 Jun. 18, 2009

(30) Foreign Application Priority Data

Dec. 18, 2007 (FR) ...................................... 07 59939

(51) Int. Cl.
F01D 25/26 (2006.01)
F01D 25/28 (2006.01)
F03B 11/00 (2006.01)
F03D 11/04 (2006.01)
F04D 29/60 (2006.01)

(52) U.S. Cl. ................. 415/213.1; 415/211.2; 60/226.1; 60/796

(58) Field of Classification Search .................. 415/201, 415/208, 210.1, 211, 2, 213.1; 60/226.1, 60/796
See application file for complete search history.

(56) References Cited

U.S. PATENT DOCUMENTS

| 5,292,227 | A | * | 3/1994 | Czachor et al. | ............ | 415/209.3 |
| 5,746,574 | A | * | 5/1998 | Czachor et al. | ................ | 415/115 |
| 5,800,224 | A | * | 9/1998 | Ogino | ........................ | 440/66 |
| 6,125,627 | A | * | 10/2000 | Rice et al. | ........................ | 60/765 |
| 7,506,499 | B2 | * | 3/2009 | Fert et al. | ..................... | 60/226.1 |

FOREIGN PATENT DOCUMENTS

EP 1 553 262 A1 7/2005
WO WO 2005/110845 A1 11/2005

* cited by examiner

Primary Examiner — David Nhu
(74) Attorney, Agent, or Firm — Oblon, Spivak, McClelland, Maier & Neustadt, L.L.P.

(57) ABSTRACT

An extension of an intermediate casing for an aircraft jet engine, intended to project towards the downstream end from an external shell of said intermediate casing is disclosed. This extension includes an annular connecting downstream end forming an annular groove open radially towards the outside, intended to receive nacelle covers. The annular connecting downstream end is produced by a plurality of angular sectors.

10 Claims, 6 Drawing Sheets

INTERMEDIATE CASING EXTENSION FOR AN AIRCRAFT JET ENGINE, COMPRISING A SECTORISED ANNULAR GROOVE FOR RECEIVING THE NACELLE COVERS

CROSS REFERENCE TO RELATED APPLICATIONS

This application claims priority from FR 07 59939 filed Dec. 18, 2007.

BACKGROUND OF THE INVENTION

1. Field of the Invention

The present invention relates in general terms to a propulsion assembly for an aircraft, of the type comprising a jet engine, a nacelle enclosing the jet engine, and an attachment strut provided with a rigid structure and means of attaching the jet engine to the rigid structure.

More precisely, the invention relates to an intermediate casing extension for the jet engine in such an assembly, intended to produce the interface between the intermediate casing and thrust reverser covers of the nacelle.

2. Description of the Related Art

The attachment strut, also referred to as an EMS (from the English Engine Mounting Structure), or pylori, or engine pylori, makes it possible to suspend the jet engine below the aircraft wing, or to mount this jet engine above this same wing, or to attach it at the rear part of the fuselage. It is in fact provided to form the connection interface between a jet engine and a given structural part of the aircraft. It makes it possible to transmit to the structure of this aircraft the forces generated by its associated jet engine and also allows the routing of the fuel, electrical and hydraulic systems and air between the engine and the aircraft.

The nacelle for its part is conventionally equipped with several covers enclosing the jet engine and allowing access to the latter in the open position, these covers being known by the terms fan covers and thrust reverser covers, the latter being articulated on the primary structure of the attachment strut.

The jet engine comprises a fan casing extended towards the rear by a so-called intermediate casing, comprising an external shell and a front transverse plate and a rear transverse plate parallel and disposed radially internally with respect to this external shell, this intermediate casing also comprising structural arms distributed angularly and extending radially between the front and rear plates, as far as the external shell.

It is this same external intermediate casing shell that is extended downstream by an extension comprising an annular connecting downstream end forming an annular groove open radially towards the outside, intended to receive the nacelle covers, and more precisely a rib of complementary shape carried by these same covers, generally the thrust reverser covers. Thus the cooperation between the rib and the complementary groove allows the transmission of the aerodynamic forces from the nacelle to the jet engine, in takeoff, flight and landing phases, in particular the axial forces, and even more particularly the counter-thrust axial forces when the thrust reverser systems equipping the nacelle covers are actuated.

In addition, the simple penetration of the rib into the groove provides easy and rapid opening of the reverser covers articulated on the strut, this opening being for example produced for implementation of maintenance operations on the aircraft parked on the ground.

One drawback relating to this solution lies in the fact that the annular groove, continuous or interrupted along the circumference of the extension, is produced within one and the same annular piece, which it is necessary to change fully in the event of damage to part of the groove receiving the covers. This drawback is extremely detrimental, especially as it has been found that the annular groove is generally stressed by the covers disproportionately along it, involving the appearance of very localised wear zones.

BRIEF SUMMARY OF THE INVENTION

The aim of the invention is therefore at least partially to remedy the problem mentioned above, relating to the designs of the prior art.

To do this, an object of the invention is an intermediate casing extension for an aircraft jet engine intended to project downstream from an external shell of the said intermediate casing, the said extension comprising an annular connecting downstream end forming an annular groove open radially towards the outside, intended to receive nacelle covers. According to the invention, the said annular connecting downstream end is produced by means of a plurality of angular sectors.

Consequently, when part of the reception groove is to be replaced, it is no longer necessary to change the entire extension, but only the angular sector or sectors concerned. Thus the segmentation of the groove receiving the nacelle covers advantageously makes it possible to reduce the duration of the maintenance operations performed on the extension, and also procures a saving in material.

Moreover, the angular sectors can advantageously differ from one another, in terms of design and/or material, according to the level of stress to which they are destined to be subjected. By way of indicative example, in the case where the nacelle covers concerned, namely preferably the thrust reverser covers, are equipped with thrust reverser systems actuated by control means of the ram type, the parts of the annular groove situated opposite these control means are generally the most stressed. A suitable material and/or design can then be adopted to produce the angular sector or sectors corresponding to the highly stressed parts, so that they resist wear better.

Preferably, the number of angular sectors constituting the annular connecting downstream end is greater than or equal to three, and even more preferably between six and twelve.

Preferably, the extension also comprises a joining shell secured to said angular sectors forming said annular connecting downstream end, said shell being situated upstream of said angular sectors and intended to extend a downstream end of the external shell of the intermediate casing.

According to a first embodiment, said joining shell is produced in a single piece on which there are mounted the angular sectors forming the said annular connecting downstream end, preferably by screwing.

According to a second embodiment, said joining shell is produced by means of a plurality of angular sectors, each produced in a single piece with one of said angular sectors forming said annular connecting downstream end. In this case, the angular sectors of the joining shell are connected together preferably by an axial connection, of the longitudinal flange type, so as to obtain the required stiffness for the ring reconstituted by these angular sectors.

Still preferentially, said angular sectors forming said annular connecting downstream end are produced, in alternation in said circumferential direction, in a first material and in a second material. This particularity makes it possible in fact to adapt the sectors according to the stress level encountered, as mentioned above. The sectors produced in the second material, referred to as the second sectors, can then be those intended to offer high resistance to wear, for example by the use of steel or titanium. The other sectors produced in the first material, referred to as first sectors, are then for their part intended to offer a lesser resistance to wear, because of their lower level of stressing by the nacelle covers. The use of more lightweight materials can then be envisaged, such as aluminium alloys.

Nevertheless, it is indicated the invention could be extended to the use of a number of distinct materials greater than two, just as it is not necessary to comply with strict alternation between the first and second sectors. In addition, still for reasons of lightening of the extension, the least stressed sectors could adopt a different design from the others, for example by having piercings.

Another object of the invention is a jet engine for an aircraft comprising an intermediate casing equipped at the downstream end of its external shell with an extension as described above.

Finally, another object of the invention is a propulsion assembly for an aircraft comprising a jet engine as described above, as well as a nacelle comprising nacelle covers cooperating with said annular groove open radially towards the outside. Preferably, this assembly also comprises an attachment strut for said jet engine comprising a rigid structure as well as means of attaching said jet engine to said rigid structure, said nacelle covers being articulated on said rigid structure.

Other advantages and characteristics of the invention will emerge from the following non-limitative detailed description.

BRIEF DESCRIPTION OF THE SEVERAL VIEWS OF THE DRAWINGS

This description will be given with regard to the accompanying drawings, among which.

DETAILED DESCRIPTION OF THE INVENTION

Figure 1:
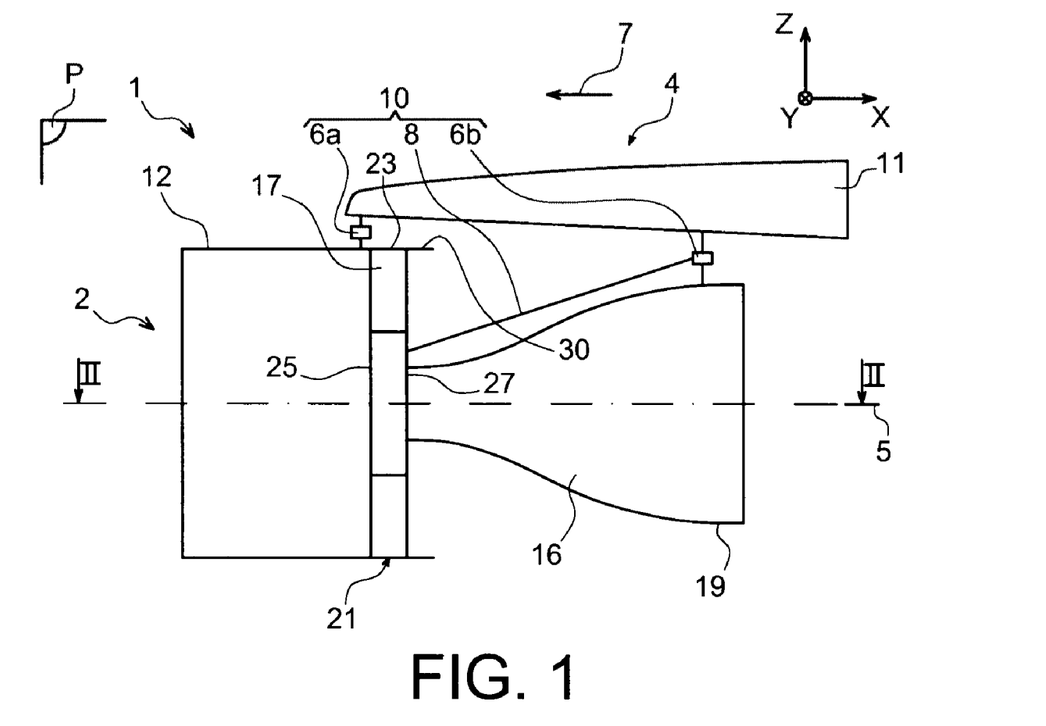
FIG. 1 depicts a schematic side view of a propulsion assembly for an aircraft according to the present invention, the nacelle having been removed for reasons of clarity.

With reference to FIG. 1, a propulsion assembly 1 for an aircraft according to a preferred embodiment of the present invention can be seen, this assembly 1 being intended to be fixed under an aircraft wing (not shown).

Overall, the propulsion assembly 1, also referred to as an integrated propulsion system, is composed of a jet engine 2, a nacelle (not shown in this figure) and an attachment strut 4 provided with means 10 of attaching the jet engine to this strut, these means preferably consisting of a front engine attachment 6a, a rear engine attachment 6b, and a device for absorbing the thrust forces taking the form of two couplers 8 (one being masked by the other in FIG. 1). By way of indication, it is noted that the assembly 1 comprises another series of attachments (not shown) for suspending this assembly 1 under the aircraft wing.

Throughout the following description, by convention, the longitudinal direction of the assembly 1, which can also be assimilated to the longitudinal direction of the jet engine 2, is referred to as X, this direction X being parallel to a longitudinal axis 5 of this jet engine 2. Moreover, the direction oriented transversely with respect to the propulsion assembly 1 and also assimilatable to the transverse direction of the jet engine 2 is called Y, and Z the vertical direction or height, these three directions X, Y and Z being orthogonal to one another.

In addition, the terms "front" and "rear" are to be considered with respect to a direction of the aircraft encountered following the thrust exerted by the jet engine 2, this direction being shown schematically by the arrow 7. In a similar manner, the terms "upstream" and "downstream" are to be considered with respect to a main direction of flow of the flows within the jet engine, a direction opposite to the direction 7.

In FIG. 1, it can be seen that only the engine attachments 6a, 6b, the thrust absorption couplers 8 and the rigid structure 11 of the attachment strut 4 have been shown. The other constituent elements, not shown, of this strut 4, such as the means of attaching the rigid structure 11 under the aircraft wing, or the secondary structure providing segregation and holding of the systems while supporting aerodynamic fairings, are conventional elements identical or similar to those encountered in the prior art, and known to experts. Consequently no detailed description will be given of these.

In addition, the jet engine 2 has a roughly conventional design, namely comprising at the front a fan casing 12, extended towards the rear by an intermediate casing 21.

The intermediate casing 21 comprises an external shell 23 situated in a rear aerodynamic extension of the fan casing, as well as transverse plates 25, 27 disposed radially internally with respect to this external shell 23, the intermediate casing 21 also comprising structural arms 17 distributed angularly and extending radially between the plates 25, 27 as far as the external shell 23, which they contact.

The jet engine also comprises a central casing 16, also referred to as a core casing, extending the intermediate casing 21 rearwards, from the rear transverse plate 27 to which it is connected. It should be noted that the central casing extends as far as a rear end 19 of greater size, also referred to as the ejection casing. Finally, the external shell 23 of the intermediate casing is extended towards the rear by an annular extension 30, also an object of the present invention, the main purpose of which is to establish a connection between the external shell 23 and the nacelle covers directly adjacent towards the downstream end. The extension 30 will be presented in detail below.

The front engine attachment 6a is interposed between the front end of the rigid structure 11, also referred to as the primary structure, and the fan casing 12 or the external shell 23 of the intermediate casing 21.

The rear attachment 6b for its part is interposed between the rigid structure 11 and the rear end 19 of the central casing 16. The two front engine attachments 6a, 6b have passing through them a mid-plane P oriented vertically and longitudinally, and passing through the axis 5. This same plane P constitutes a plane of symmetry for the two couplers 8 absorbing the thrust forces, on each side of which they are situated respectively. Each coupler 8 has a rear end articulated on a body of the rear engine attachment 6b, and a front end connected to the transverse plate 27.

Figure 2:
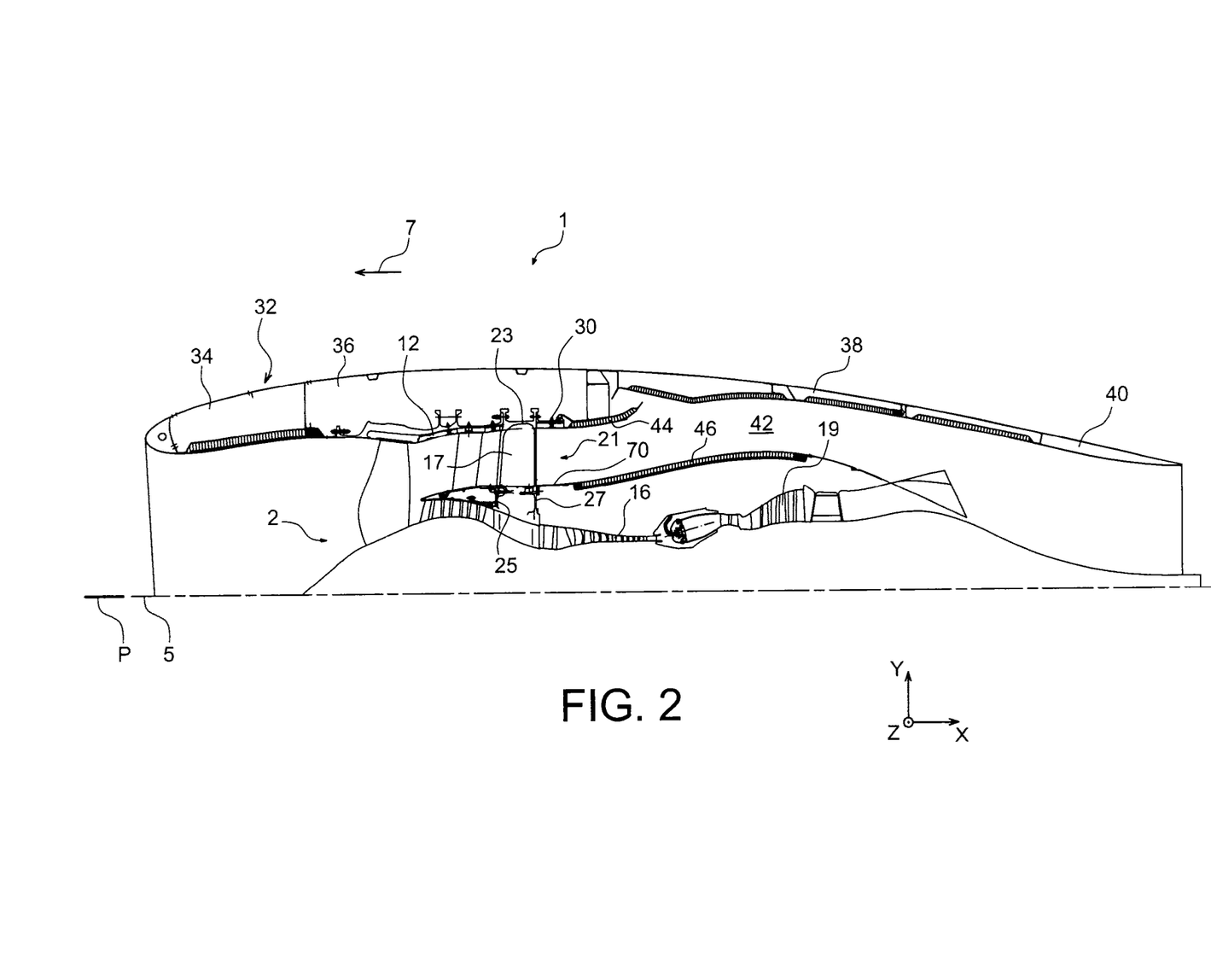
FIG. 2 depicts a more detailed partial view in section of the assembly shown in FIG. 1, taken along the line II-II in this same figure.

With reference now to the more detailed FIG. 2 showing the nacelle 32 of the propulsion assembly 1, it should be noted that this forms a continuous aerodynamic external surface consisting of an air inlet 34, fan covers 36, thrust reverser covers 38 and a fixed rear cowling 40, these elements being arranged adjacent from front to rear.

The thrust reverser covers 38, generally two in number and articulated on the rigid structure of the strut, in a known fashion delimit an annular secondary flow channel 42 by virtue of external 44 and internal 46 annular skins.

Figure 3:
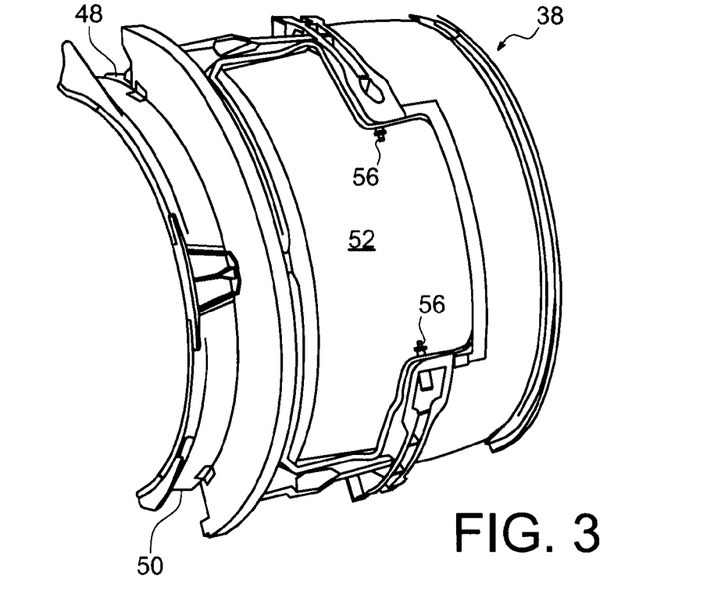
FIG. 3 depicts a partial perspective view of a thrust reverser cover belonging to the nacelle shown in FIG. 2.
Figure 4:
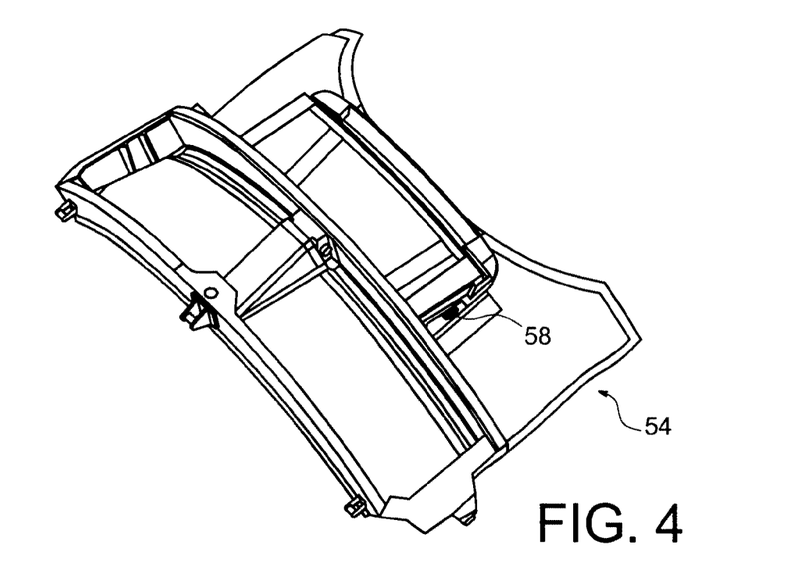
FIG. 4 depicts a perspective view of a thrust reverser system intended to equip the cover shown in FIG. 3.
Figure 5:
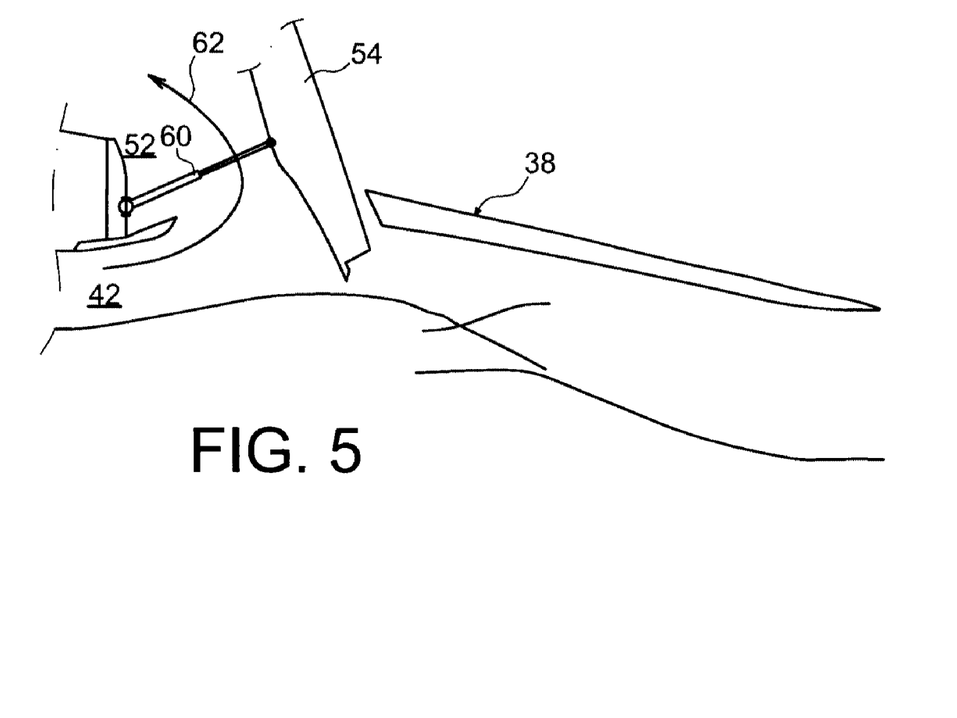
FIG. 5 depicts a schematic view of the thrust reverser system shown in the actuated configuration.

As shown in FIGS. 3 and 4, each thrust reverser cover 38, also referred to as a rear cover or core cover, has the general shape of a semi-cylinder, the top end 48 being intended to be articulated on the rigid structure of the strut and the bottom end 50 being intended to be locked at the bottom end of the other cover 38, by conventional means. In addition, it has at its centre a housing 52 for fitting a thrust reverser system, here taking the form of a system with a pivoting door 54 shown in FIG. 4. Overall, this system 54 therefore forms a door able to pivot about the axis defined by the two opposite pins 56 formed in the opening 52, respectively intended to be housed in reception orifices 58 in the door 54. In addition, control means such as a ram or the like are capable of rotating the door 54, as shown in FIG. 5, in which the deployed ram 60 holds the door 54 in the thrust reversal configuration. In this configuration, the air following the secondary channel 42 is forced to be extracted from the cover 38 because of the closure of this channel towards the downstream end by the inclined door 54, this air extraction outside the nacelle taking place substantially in reverse flow because of the inclination of this door 54, as testified to by the arrow 62. For example the ram 60 has a front end connected to the frame of the housing 52 and a rear end connected to the door itself.

Figure 6:
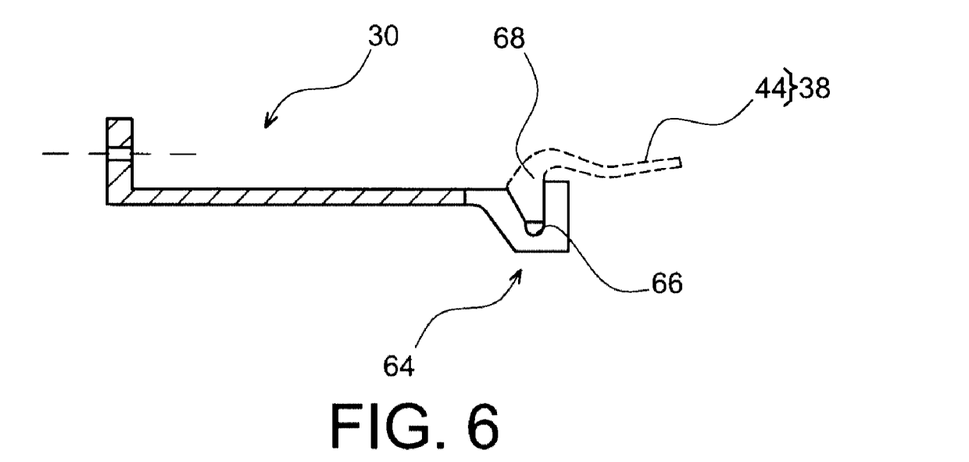
FIG. 6 depicts an enlarged partial view in section of the one shown in FIG. 2, depicting the cooperation between the intermediate casing extension and one of the nacelle covers.

In FIG. 6, it can be seen that the cover 38 cooperates with the extension 30. This is because the latter has an annular connecting downstream end 64 forming an annular groove 66 open radially towards the outside and receiving a rib 68 of complementary shape carried by the cover 38, at the upstream end of its external annular skin 44.

The annular groove 66 preferably has a V-shaped cross section, in which the rib 68 is therefore housed, projecting radially towards the inside, and also having a V-shaped cross section. The cooperation between the rib 68 and the complementary groove 66 allows transmission of the aerodynamic forces from the reverser cover 38 to the jet engine, and in particular the axial forces, and even more particularly the axial counter-thrust forces passing through the rams 60 when the doors 68 are deployed, as is the case in FIG. 5.

Figure 7:
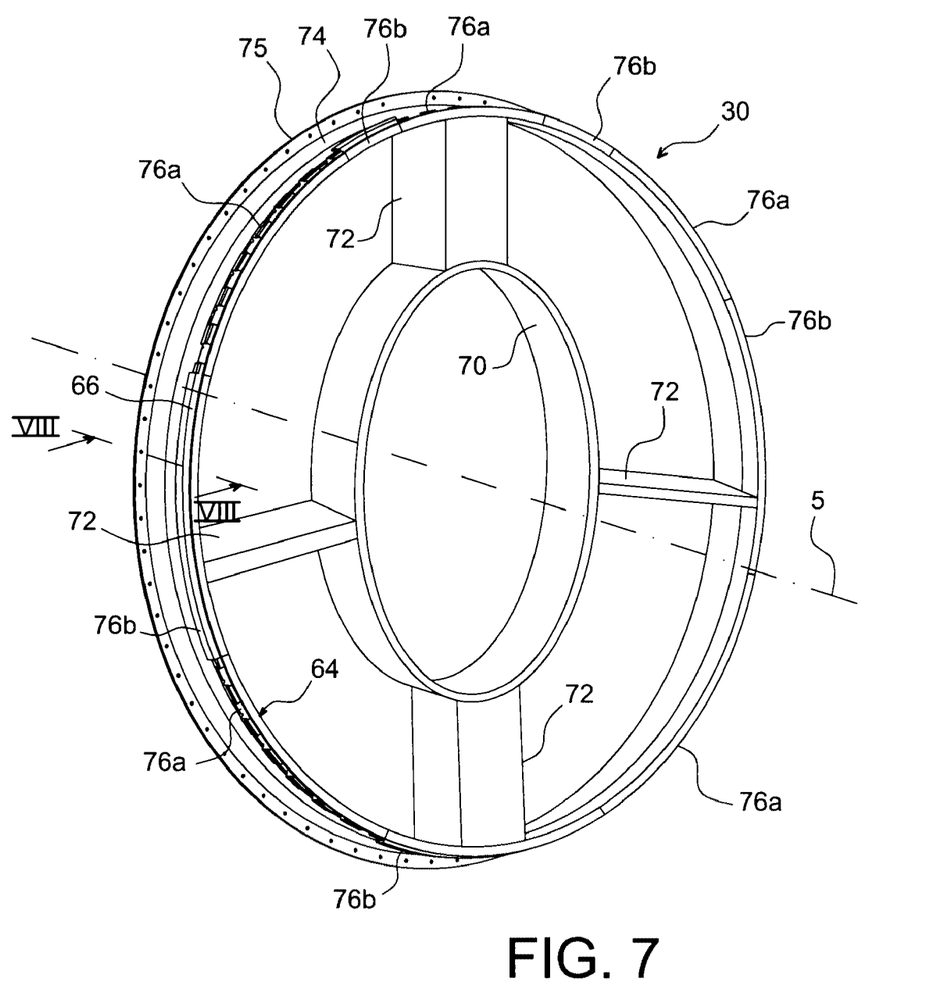
FIG. 7 shows a perspective view of the extension shown in FIG. 2, according to a preferred embodiment of the present invention.

FIG. 7 shows an arrangement also referred to as a thrust reverser kit including the extension 30 as its radially external end. This arrangement comprises, radially towards the inside, a ring 70 intended to be centred on the axis 5 of the jet engine, the purpose of which is to establish the mechanical junction with the internal annular skin 46 of the thrust reverser covers 38. The concentric ring 70 and annular extension 30 are rigidly connected together by means of structural arms 72 arranged radially, and for example provided four in number and being spaced apart from one another by approximately 90°.

With regard to the extension 30 intended to establish the mechanical junction with the external annular skin 44, this has a joining shell 74 in a single piece, the front end of which, in the form of an annular collar 75, allows fixing by screwing of the arrangement on the downstream end of the external shell 23 of the intermediate casing. One of the particularities of the present invention lies in the fact that the joining shell 74, extending in a single piece over 360°, carries towards the front a plurality of angular sectors 76a, 76b forming conjointly the annular connecting downstream end 64. Thus they form together a structure extending in a substantially continuous fashion over 360° around the axis 5, defining the annular groove 66 which for its part may be continuous or interrupted along the circumference of the extension. In general terms, this groove 66, when it is intended to cooperate with two thrust reverser covers, is interrupted only at the passage of the rigid structure of the attachment strut on which these covers are articulated, and at the bottom ends of these same covers. Consequently the groove 66 normally has two diametrically opposed interruptions, preferably set to be at 6 o'clock and 12 o'clock.

In the arrangement in FIG. 7, which can be attached as it is to the intermediate casing with the structural arms 72 extending towards the rear some of the structural arms 17 of this casing, two sorts of angular sector are arranged in alternation in the circumferential direction. Thus the first angular sectors 76a, produced from a first lightweight material such as an aluminium alloy, are attached to the joining shell 74 at positions where the level of forces transmitted by the thrust reverser covers is relatively low. They alternate with second angular sectors 76b, produced from a second material more resistant to wear, such as steels or titanium, and attached to the joining shell 74 at positions where the level of forces transmitted by the thrust reverser covers is greater. In particular, such second sectors 76b are situated in line, in the longitudinal/axial direction, with the control rams 60 for the thrust reversal systems, whether these systems be of the "door" type as described above or of another design known to persons skilled in the art, such as a so-called "grille" type.

The number of these angular sectors 76a, 76b disposed in alternation and easily replaceable in the event of wear is adopted according to the requirements encountered, for example ten as in the preferred embodiment depicted.

In addition, the first angular sectors 76a can be further lightened by a different design from that of the second sectors 76b, for example by having piercings. In this regard, it should be noted that the first and second sectors 76a, 76b could alternatively be produced from the same material and only differ through their design, or even be of substantially identical design. Whatever the case, the angular extent may vary from one sector to another, the choice being made according to the requirements encountered.

Figure 8:
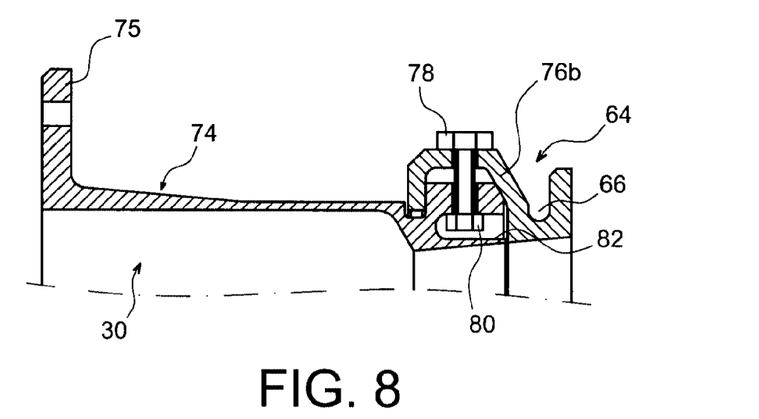
FIG. 8 depicts a view in section taken along the line VIII-VIII in FIG. 7.

The easily replaceable character of the adjacent sectors in the circumferential direction stems from their screwed assembly on the downstream end of the joining shell 74, by means of substantially radially oriented screws 78, as shown in FIG. 8. In this configuration, the nuts 80 cooperating respectively with the screws 78 are housed in through orifices 82 provided for this purpose in the downstream end of the joining shell 74, attached by screwing to the intermediate casing by means of the collar 75, or alternatively produced in a single piece with the external shell 23 of the intermediate casing.

Figure 8A:
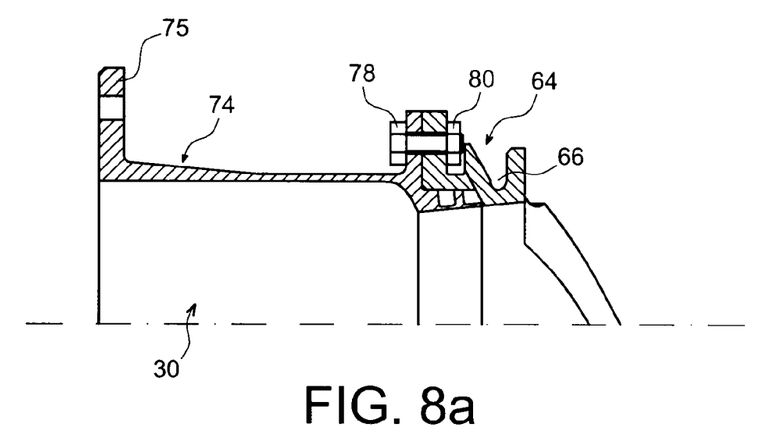
FIG. 8a depicts a view similar to that shown in FIG. 8, with the extension produced in an alternative manner.

Alternatively, the screwed junction between the angular sectors 76a, 76b and the shell 74 can be effected by means of longitudinally oriented screws 78, as shown in FIG. 8a with the presence of two fixing flanges in contact, extending radially towards the outside.

Figure 9:
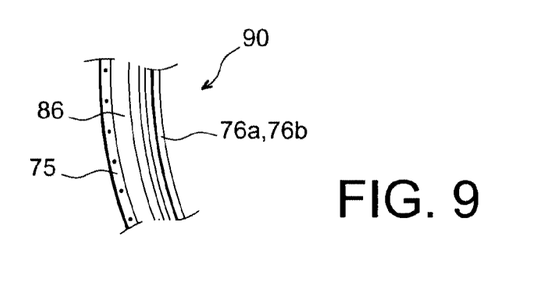
FIG. 9 depicts a perspective view of a sector intended for forming an intermediate casing extension according to another preferred embodiment of the present invention.

FIG. 9 shows another preferred embodiment of the present invention in which the joining shell is not produced in a single piece but in a sectorised manner like the annular connecting downstream end 64 forming an annular groove. This is because the joining shell is formed by a plurality of angular shell sectors 86, one of which is shown in FIG. 9, these sectors 86 therefore being adjacent in the circumferential direction. Preferably, each sector 86 carries its own collar 75 for mounting thereof on the external shell of the intermediate casing, and is produced in a single piece with one of the aforementioned sectors 76a, 76b. Consequently the single piece then comprises a collar sector 86 upstream and a groove sector 76a, 76b downstream, preferably of the same angular extent, in order to form an extension sector referenced 90.

Naturally various modifications can be made by persons skilled in the art to the propulsion assembly 1 for an aircraft that has just been described, solely by way of non-limitative example.

The invention claimed is:

1. An extension of an intermediate casing for an aircraft jet engine, intended to project towards a downstream end from an external shell of said intermediate casing, said extension comprising:
   an annular connecting downstream end forming an annular groove open radially towards an outside, intended to receive nacelle covers,
   wherein said annular connecting downstream end is produced by means of a plurality of angular sectors.

2. The extension according to claim 1, wherein the plurality of angular sectors is greater than or equal to three.

3. The extension according to claim 1 or claim 2, further comprising a joining shell secured to said angular sectors forming said annular connecting downstream end, said joining shell being situated upstream of said angular sector and intended to extend a downstream end of the external shell of the intermediate casing.

4. The extension according to claim 3, wherein said joining shell is produced in a single piece, on which the angular sectors forming said annular connecting downstream end are mounted.

5. The extension according to claim 4, characterised in that wherein the angular sectors forming said annular connecting downstream end are mounted by screwing on said joint shell.

6. The extension according to claim 3, wherein said joining shell is produced by means of a plurality of other angular sectors, each produced in a single piece with one of said angular sectors forming said annular connecting downstream end.

7. The extension according to claim 1, characterised in that wherein said plurality of angular sectors forming said annular connecting downstream end are produced, in alternation in said circumferential direction, from a first material and a second material.

8. A jet engine for an aircraft, comprising an intermediate casing equipped at the downstream end of its external shell with an extension according to claim 1.

9. A propulsion assembly for an aircraft comprising:
   a jet engine according to claim 8; and
   a nacelle comprising nacelle covers cooperating with said annular groove open radially towards the outside.

10. A propulsion assembly according to claim 9, further comprising an attachment strut for said jet engine comprising a rigid structure and means of attaching said jet engine to said rigid structure, said nacelle covers being articulated on said rigid structure.

* * * * *

UNITED STATES PATENT AND TRADEMARK OFFICE
CERTIFICATE OF CORRECTION

| | | |
|---|---|---|
| PATENT NO. | : 8,172,527 B2 | Page 1 of 1 |
| APPLICATION NO. | : 12/334949 | |
| DATED | : May 8, 2012 | |
| INVENTOR(S) | : Thierry Francois Maurice Duchatelle et al. | |

It is certified that error appears in the above-identified patent and that said Letters Patent is hereby corrected as shown below:

Column 1, line 26, change "pylori" to --pylon--;

Column 1, line 27, change "pylori" to --pylon--;

Column 8, line 10, delete "characterised in that" after "claim 4"; and

Column 8, line 18, delete "characterised in that" after "claim 7".

Signed and Sealed this
Thirty-first Day of July, 2012

David J. Kappos
*Director of the United States Patent and Trademark Office*